United States Patent
Lahdenniemi et al.

(10) Patent No.: US 8,761,664 B2
(45) Date of Patent: Jun. 24, 2014

(54) NEAR FIELD CONNECTION ESTABLISHMENT

(75) Inventors: Jussi Lahdenniemi, Kangasala (FI); Jukka Gronroos, Tampere (FI); Jussi Lehto, Tampere (FI)

(73) Assignee: Nokia Corporation, Espoo (FI)

( * ) Notice: Subject to any disclaimer, the term of this patent is extended or adjusted under 35 U.S.C. 154(b) by 824 days.

(21) Appl. No.: 12/442,349

(22) PCT Filed: Sep. 20, 2006

(86) PCT No.: PCT/FI2006/050404
§ 371 (c)(1),
(2), (4) Date: Apr. 9, 2010

(87) PCT Pub. No.: WO2008/034937
PCT Pub. Date: Mar. 27, 2008

(65) Prior Publication Data
US 2010/0197224 A1    Aug. 5, 2010

(51) Int. Cl.
H04B 5/00    (2006.01)

(52) U.S. Cl.
USPC ................... 455/41.1; 455/41.2; 455/410

(58) Field of Classification Search
USPC ................. 455/41.1, 41.2, 410, 411
See application file for complete search history.

(56) References Cited

U.S. PATENT DOCUMENTS

| 8,005,426 B2 * | 8/2011 | Huomo et al. ............ 455/41.2 |
| 8,081,060 B1 | 12/2011 | Saarisalo et al. |
| 2006/0002331 A1 | 1/2006 | Bhagwat et al. |
| 2006/0193300 A1 | 8/2006 | Rawat et al. |
| 2007/0238437 A1 | 10/2007 | Jaakkola |
| 2009/0215385 A1 * | 8/2009 | Waters et al. ............ 455/1 |

FOREIGN PATENT DOCUMENTS

| WO | 2006/040544 A1 | 4/2006 |
| WO | 2006/077418 A1 | 7/2006 |
| WO | 2006/087503 A1 | 8/2006 |
| WO | 2006/095212 A1 | 9/2006 |
| WO | WO2006095212 | 9/2006 |

OTHER PUBLICATIONS

International Search Report of the International Searching Authority for corresponding International Patent Cooperation Treaty Application PCT/FI2006/050404, dated Jun. 12, 2007, 4 pages.
Written Opinion of the International Searching Authority for corresponding International Patent Cooperation Treaty Application PCT/FI2006/050404, dated Jun. 12, 2007, 7 pages.
Extended European Search Report for European Application No. 06794121.1—Dated May 27, 2013, 6 pages.

* cited by examiner

*Primary Examiner* — Tuan H Nguyen
(74) *Attorney, Agent, or Firm* — Locke Lord LLP

(57) ABSTRACT

Disclosed is an apparatus capable of hosting a secure module. The apparatus comprises a communication unit capable of near field communications, and a control unit configured to co-operate with the secure module. The control unit is further configured to detect a radio frequency field and, in response to the detection of the radio frequency field, to pass, to the secure module, control of establishing a near field connection through the communication unit. Also disclosed is a secure module, comprising a control unit configured to assume control of establishing a near field connection, wherein the control unit is further configured to provide, in the course of the near field connection establishment, a set of capabilities comprising near field communication capabilities of the secure module and near field communication capabilities of an apparatus hosting the secure module.

20 Claims, 7 Drawing Sheets

| bit8 | bit7 | bit6 | bit5 | bit4 | bit3 | bit2 | bit1 |
|------|------|------|------|------|------|------|------|
| 0 | 1 | 1 | 1 | 1 | 0 | 0 | 0 |

| bit8 | bit7 | bit6 | bit5 | bit4 | bit3 | bit2 | bit1 |
|------|------|------|------|------|------|------|------|
| 0 | 1 | 1 | 0 | 0 | 0 | 0 | 0 |

NEAR FIELD CONNECTION ESTABLISHMENT

RELATED APPLICATION

This application was originally filed as PCT Application No. PCT/FI2006/050404 filed Sep. 20, 2006.

FIELD OF THE INVENTION

The present invention generally relates to communication systems and use of near field communication.

BACKGROUND OF THE INVENTION

Near field communication (NFC) is a communication technology that operates in short distances (for example in distances below tens of centimeters). Information may be transferred for example over RFID (radio-frequency identification) protocols. Usually, one of the parties in near field communications is a passive device, such as a card or a tag, and the other one is an active device, such as an RFID reader or a mobile phone with an integrated RFID circuitry. Also NFC communication between two active devices is possible.

A mobile phone with NFC capabilities and an incorporated secure module capable of holding sensitive information such as credit card data may act both as a passive RFID device and as an active RFID reader. For such mobile phone there are various use cases. First, users may wish to read and write information from passive RFID tags (browser shortcuts, business cards, etc.), that is, to interact with external passive devices. Secondly, the secure smartcard module hosted in the mobile phone may function as a passive RFID device itself for example for ticketing and payment applications. Thirdly, the mobile phone may act as an active device interacting with another active RFID device such as another mobile phone in peer-to-peer type of communications. That is, in the second and the third case the mobile phone interacts with external active device.

The dual nature of the usage of the NFC technology in mobile phones, when interacting with external active devices, causes a problem that one must know, which functionality to expose to external parties, which are willing to communicate with the mobile phone.

One approach to solving this situation is to always start near field communications using the MCU (Microcontroller Unit) software of the mobile phone (that is, the part of the mobile phone that may act as an active communication party) and, when it is found out that the other party actually wishes to communicate with the secure module (that is, the part of the mobile phone that may act as a passive communication party), the communication is handed over to the secure module. This approach causes two major problems. Firstly, when initiating communications, an external RFID reader wishing to communicate with a secure module first sees a certain device that does not look like a standard secure module it expects to see. Some readers might get confused with this and, for example, display an error message in a user interface, although the correct target (secure module) does appear in the field right after the mobile phone switches it on (after noticing that the communication is actually directed to the secure module). Secondly, the handover of communications to the secure module forces the handshake phase of the protocol to be redone, which may take a substantial amount of time—substantial enough to make it impossible to pass certain strict compliancy tests related to some payment applications for example.

Another approach is to always start near field communications with the secure module. However, in this case, the MCU software does not have control over the handshake process and thereby cannot make the mobile phone to initially appear as nothing else than a passive card. Thus external devices that might want to communicate with the MCU software may interpret the situation such that communication with the MCU software is not possible.

Previously, the former approach has been taken. The drawbacks have been there however. Thus, near field communication establishment may still require further considerations.

SUMMARY

According to a first aspect of the invention there is provided an apparatus capable of hosting a secure module, the apparatus comprising
  a communication unit capable of near field communications, and
  a control unit configured to co-operate with the secure module, wherein
  the control unit is further configured to detect a radio frequency field and, in response to the detection of the radio frequency field, to pass, to the secure module, control of establishing a near field connection through the communication unit.

According to a second aspect of the invention there is provided a secure module, comprising
  a control unit configured to assume control of establishing a near field connection, wherein
  the control unit is further configured to provide, in the course of the near field connection establishment, a set of capabilities comprising near field communication capabilities of the secure module and near field communication capabilities of an apparatus hosting the secure module.

According to a third aspect of the invention there is provided a method for use in an apparatus capable of near field communications and capable of hosting a secure module, the method comprising
  detecting a radio frequency field; and
  in response to the detection of the radio frequency field, passing control of establishing a near field connection to the secure module.

In an embodiment of the invention the method may further comprise listening to data exchange relating to the near field connection establishment.

Further the method may comprise
  identifying an indication of a connection attempt addressed to functionality of said apparatus in said data exchange relating to the near field connection establishment; and in response to identifying such indication
  intercepting the near field connection establishment in the secure element; and
  continuing with the near filed connection establishment.

Alternatively or additionally the method may further comprise
  identifying an indication of a connection attempt addressed to functionality of the secure module in said data exchange relating to the near field connection establishment, and
  allowing the secure module to continue with the near field connection establishment in response to identifying such indication.

In an embodiment of the invention the passing of control to a secure module is conducted by activating the secure module. Prior to passing control to the secure module, it may be checked, whether the apparatus is in such state that the secure module may be activated.

According to a fourth aspect of the invention there is provided a method for use in a secure module, the method comprising
assuming control of establishing a near field connection, and providing, in the course of the near field connection establishment, a set of capabilities comprising near field communication capabilities of the secure module and near field communication capabilities of an apparatus hosting the secure module.

According to a fifth aspect of the invention there is provided a signal for providing near field communication capabilities, comprising near field communication capabilities of a secure module and near field communication capabilities of an apparatus hosting the secure module.

According to a sixth aspect of the invention there is provided a computer program stored in a computer readable medium, the computer program comprising computer executable program code adapted to cause an apparatus to perform the method of claim 10.

According to a seventh aspect of the invention there is provided a computer program stored in a computer readable medium, the computer program comprising computer executable program code adapted to cause an apparatus to perform the method of claim 16.

The computer programs of the sixth and seventh aspects may consist of program code executable by any one of the following: a multipurpose processor; a microprocessor; an application specific integrated circuit; a digital signal processor; and a master control processor.

According to an eighth aspect of the invention there is provided a control unit for use in an apparatus comprising near field communication capabilities, wherein the control unit is configured
to co-operate with a secure module,
to detect a radio frequency field, and
in response to the detection of the radio frequency field, to pass, to the secure module, control of establishing a near field connection through the near field communication capabilities of said apparatus.

The control unit of the eighth aspect may be implemented for example on a chipset.

According to a ninth aspect of the invention there is provided a chipset, comprising
a communication unit capable of near field communications, and
a control unit configured to co-operate with a secure module, wherein
the control unit is further configured to detect a radio frequency field and, in response to the detection of the radio frequency field, to pass, to the secure module, control of establishing a near field connection through the communication unit.

According to a tenth aspect of the invention there is provided an apparatus capable of near field communications and capable of hosting a secure module, the apparatus comprising
means for detecting a radio frequency field; and
means for passing control of establishing a near field connection to the secure module in response to the detection of the radio frequency field.

According to a eleventh aspect of the invention there is provided a secure module comprising
means for assuming control of establishing a near field connection, and
means for providing, in the course of the near field connection establishment, a set of capabilities comprising near field communication capabilities of the secure module and near field communication capabilities of an apparatus hosting the secure module.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which:

FIG. 6A-6B show a communication capability message according to an embodiment of the invention.

DETAILED SPECIFICATION

In the description below, like reference numbers are used to denote like parts.

The term communication apparatus or mobile station used in this description refers in general to any device capable of hosting near field communication equipment. Such device may be for example a GSM (Global System for Mobile communication) terminal, a 3G (third-generation) terminal, a UMTS (Universal Mobile Telecommunications Service) terminal, a WCDMA (Wideband Code-Division Multiple Access) terminal or a terminal using WLAN (Wireless Local Area Network) for radio communications. Additionally such device may be a general purpose computer, a laptop computer or some other computing device. Typically such device is handheld or otherwise easily movable.

The term mobile control unit, microcontroller unit, control unit or processor used in this description refers in general to any computing equipment capable of processing information according to predefined instructions. It should be appreciated that even though one of the terms is used in connection with a particular embodiment of the invention, also other processing or computing equipment may be applicable in such embodiment.

Figure 1A:
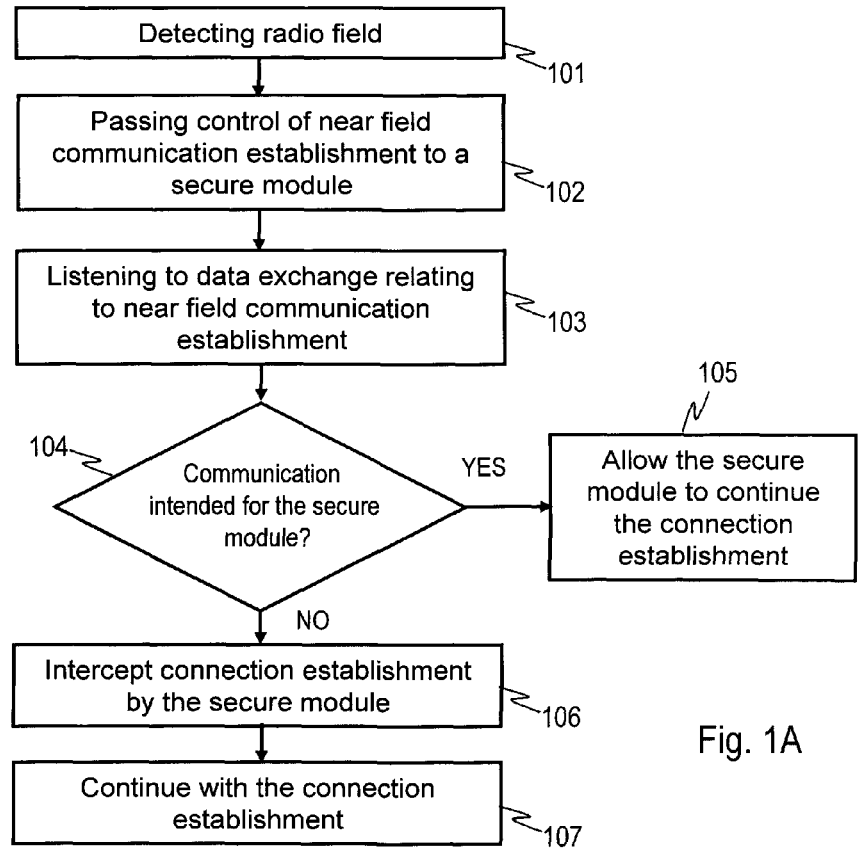
FIG. 1A shows a flow diagram of a method for use in a communication apparatus according to an embodiment of the invention.

FIG. 1A shows a flow diagram of a method for use in a communication apparatus according to an embodiment of the invention.

In step 101 the communication apparatus detects a radio frequency field. In response to the detection of the radio frequency field, control of establishing a near field connection is passed to a secure module in step 102. Passing the control to the secure module may mean that the communication apparatus simply turns on power for the secure module. If necessary, also some more complicated activation procedure may however be conducted. Then the communication apparatus proceeds to listening data exchange relating to the near field connection establishment in step 103.

In an embodiment of the invention the step 102 may further comprise checking, prior to passing control to the secure module, whether the communication apparatus is in such state that the secure module may be turned on or activated. If the communication apparatus is not in such state, it may be decided that the procedure does not proceed to passing the control to the secure module. Instead, for example a control unit of the communication apparatus may assume control of the near field connection establishment in such case.

In step 104 the communication apparatus monitors whether the near field connection attempt is intended to functionality of the secure module or to functionality of the communication apparatus. If the connection is intended for the secure module, the procedure proceeds to step 105 and the communication apparatus allows the secure module to continue with the near field connection establishment. That is, the communication apparatus does not necessarily do anything concrete in step 105. If the communication apparatus notices in step 104 that the connection is intended for the communication apparatus, the procedure proceeds to step 106 and the communication apparatus intercepts the near field connection establishment in the secure element and continues itself with the near filed connection establishment in step 107.

Figure 1B:
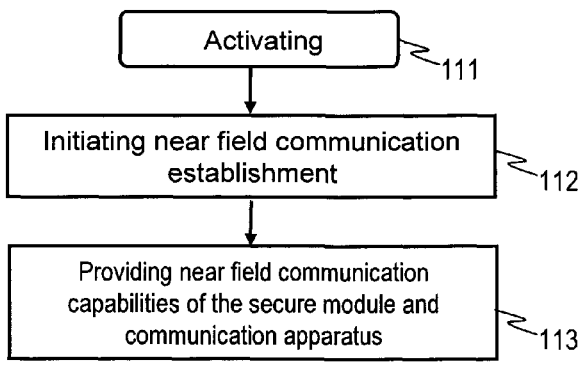
FIG. 1B shows a flow diagram of a method for use in a secure module according to an embodiment of the invention.

FIG. 1B shows a flow diagram of a method for use in a secure module according to an embodiment of the invention.

First the secure module is activated in step 111. For example some control of an apparatus hosting the secure module switches on power for the secure module. Also some more complicated activation procedure may be conducted if needed. The secure module then assumes control of establishing a near field connection. In step 112, the secure module initiates near field connection establishment for example by responding to messages relating to secure module detection procedure. Then in step 113, the secure module provides to an external party a set of capabilities comprising near field communication capabilities of the secure module and near field communication capabilities of the apparatus hosting the secure module. After this the secure module may either continue with the near field connection or be intercepted by the apparatus hosting it (not shown in FIG. 1B).

It should be appreciated that the phases illustrated in FIGS. 1A and 1B may be conducted out of order and repeated as many times as necessary.

Figure 2:
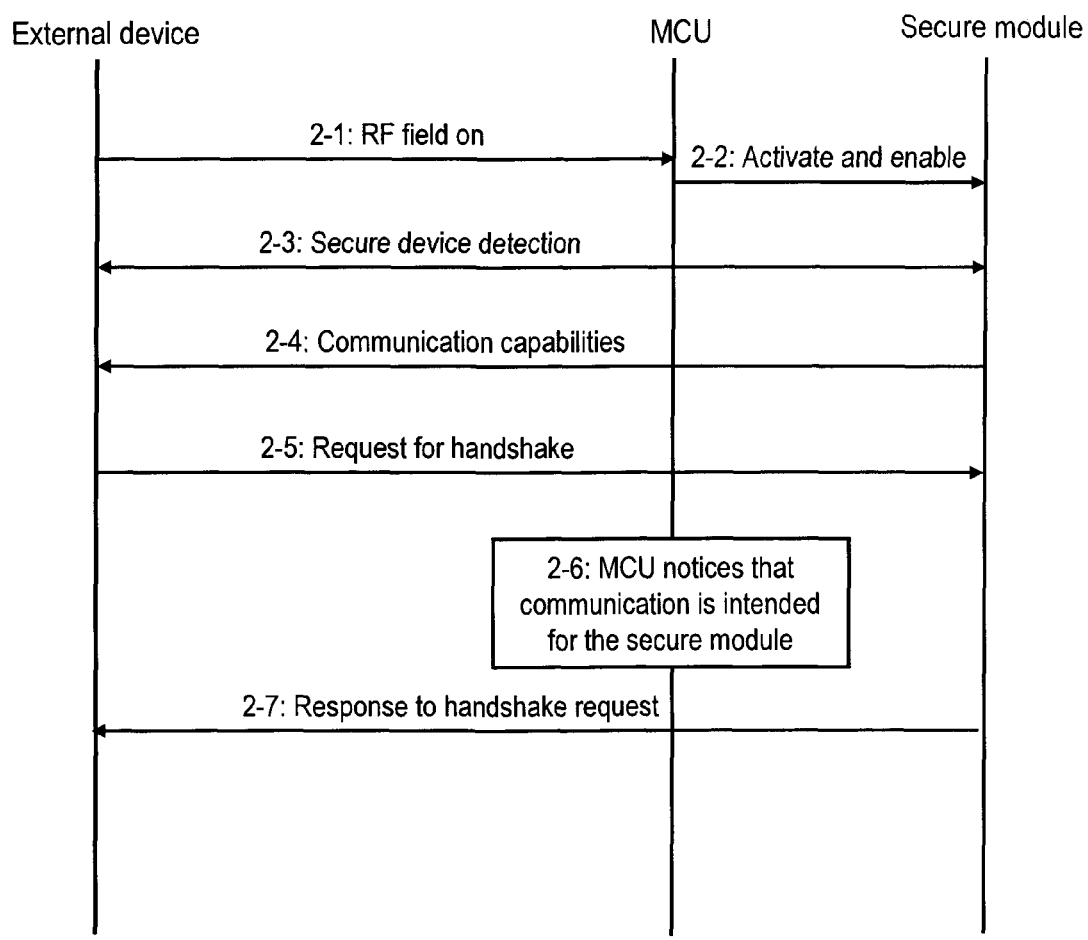
FIG. 2 shows a messaging diagram according to an embodiment of the invention.

FIG. 2 shows a messaging diagram according to an embodiment of the invention. The shown example illustrates the situation where an external party wishes to communicate with a secure module hosted in some suitable apparatus, which may be for example a mobile phone or some other communication apparatus or handheld device.

First, a radio frequency field 2-1 of an external device reaches a MCU of the apparatus hosting the secure module. This may mean simply that RF field of the external device is always on and the apparatus is placed in proximity of the external device. The MCU detects that the radio field is on and activates 2-2 the secure module hosted in the apparatus. The secure module assumes responsibility of near field connection establishment. The external device and the secure module conduct secure module detection 2-3, which may comprise exchange of various messages depending on the used communication protocols. The MCU remains inactive but listens to the data exchange between the secure module and the external device.

In the course of near field connection establishment the secure module provides to the external device communication capabilities 2-4 comprising indication of near field communication capabilities of the secure module and of the MCU. On the basis of the communication capabilities 2-4 the external device sees that the higher level protocol it is using is supported and requests handshake 2-5 according to that protocol. In phase 2-6 the MCU notices on the basis of the handshake request that the near field connection is intended for the secure module. Thus the MCU continues to remain inactive and allows the secure module to continue to respond 2-7 to the handshake request.

Figure 3:
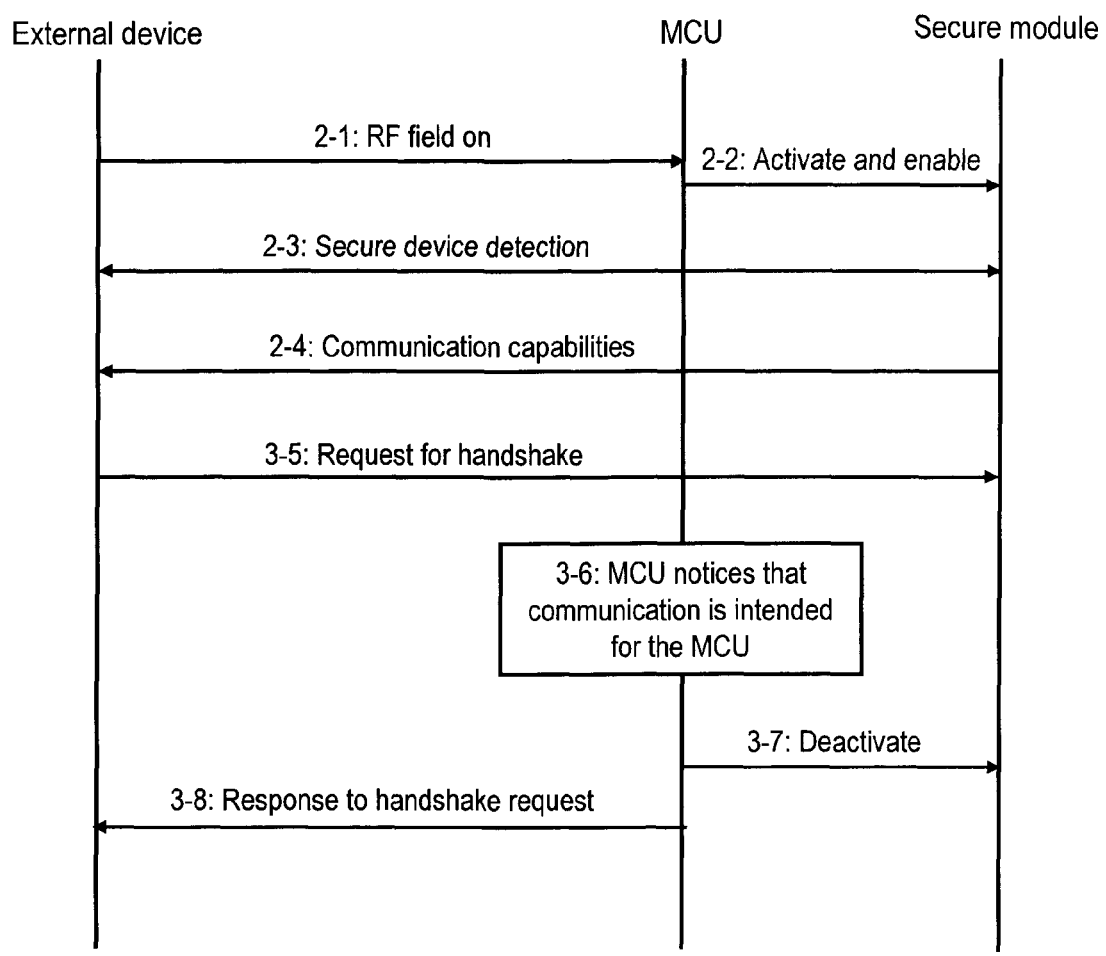
FIG. 3 shows a messaging diagram according to another embodiment of the invention.

FIG. 3 shows a messaging diagram according to another embodiment of the invention. The shown example illustrates the situation where an external party wishes to communicate with the apparatus hosting a secure module and not with the secure module. Until message 2-4 the messaging is equal to the messaging of FIG. 2. But now the external device sends a request for handshake 3-5, which is intended for the MCU. The MCU sees this in phase 3-6, deactivates 3-7 the secure module, and responds 3-8 to the handshake request.

Figure 4:
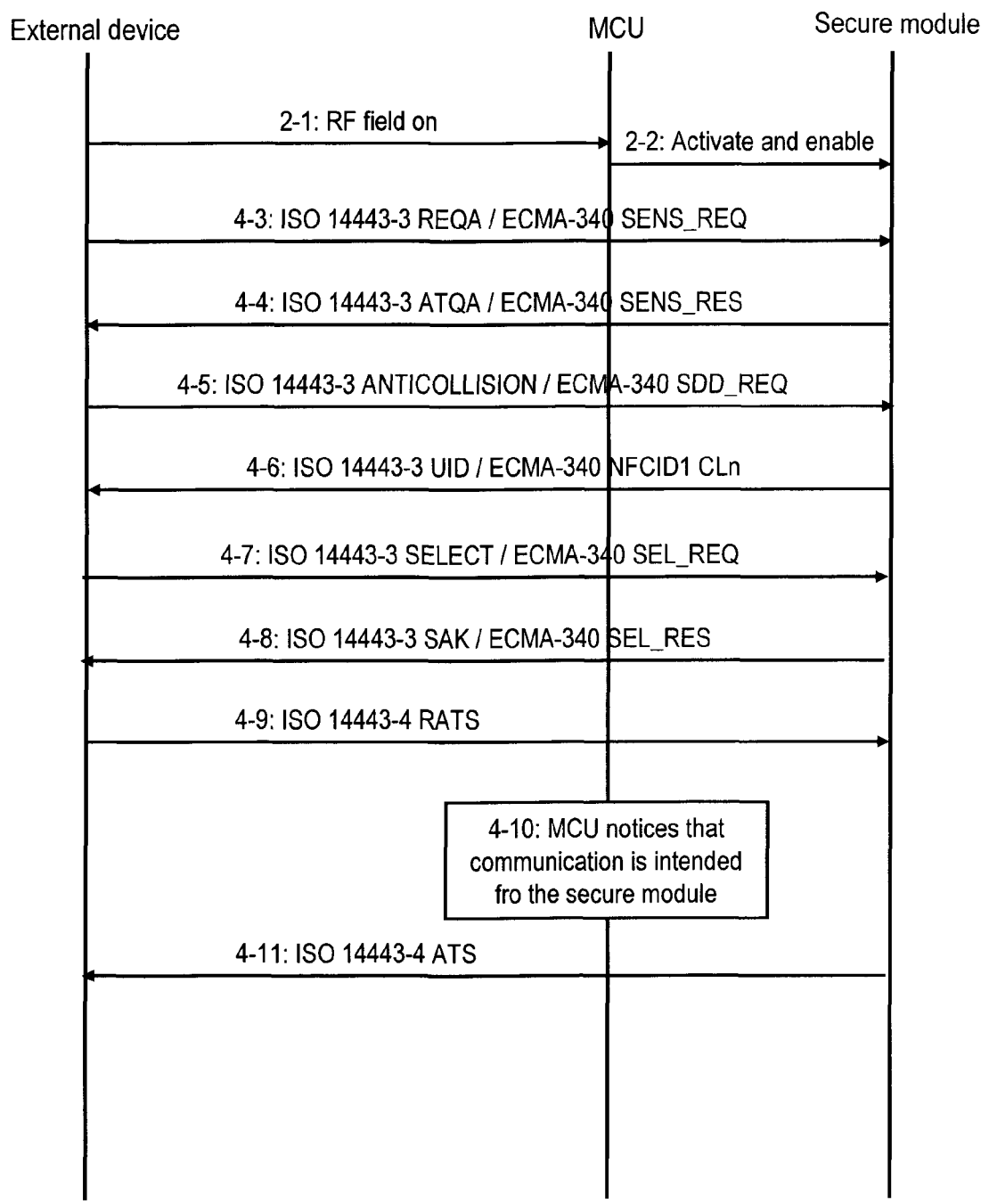
FIG. 4 shows a messaging diagram according to yet another embodiment of the invention.

FIG. 4 shows a messaging diagram according to yet another embodiment of the invention. This example illustrates details of the example of FIG. 2 in case the protocol of ISO 14443 standard and NFCIP-1 protocol of ECMA-340 standard are used. The messages relating to secure device detection and informing of communication capabilities are the same in both standards, but the messages have different names. Herein names of messages according to both standards are used.

Like in FIG. 2, first a radio frequency field 2-1 of an external device reaches MCU of an apparatus hosting a secure module. The MCU detects that the radio field is on and activates 2-2 the secure module. The secure module assumes responsibility of near field connection establishment and the MCU remains inactive but listens to the data exchange between the secure module and the external device.

The external device and the secure module conduct secure module detection by exchanging the following messages:

4-3: ISO 14443-3 REQA/ECMA-340 SENS_REQ
4-4: ISO 14443-3 ATQA/ECMA-340 SENS_RES
4-5: ISO 14443-3 ANTICOLLISION/ECMA-340 SDD_REQ
4-6: ISO 14443-3 UID/ECMA-340 NFCID1 CLn
4-7: ISO 14443-3 SELECT/ECMA-340 SEL_REQ.

Then the secure module sends in 4-8: ISO 14443-3 SAK/ECMA-340 SEL_RES message an indication that near field communication according to ISO 14443 and NFCIP-1 are supported. More specific examples of contents of such message are discussed below in connection with FIGS. 6A and 6B. Now the external device is seeking to communicate with the secure module according to ISO 14443 standard and sends ISO 14443-4 RATS message 4-9. The MCU notices this in phase 4-10 and continues to remain inactive. The secure module responds to the RATS message with ISO 14443-4 ATS message 4-11 and continues with the near field connection.

Figure 5:
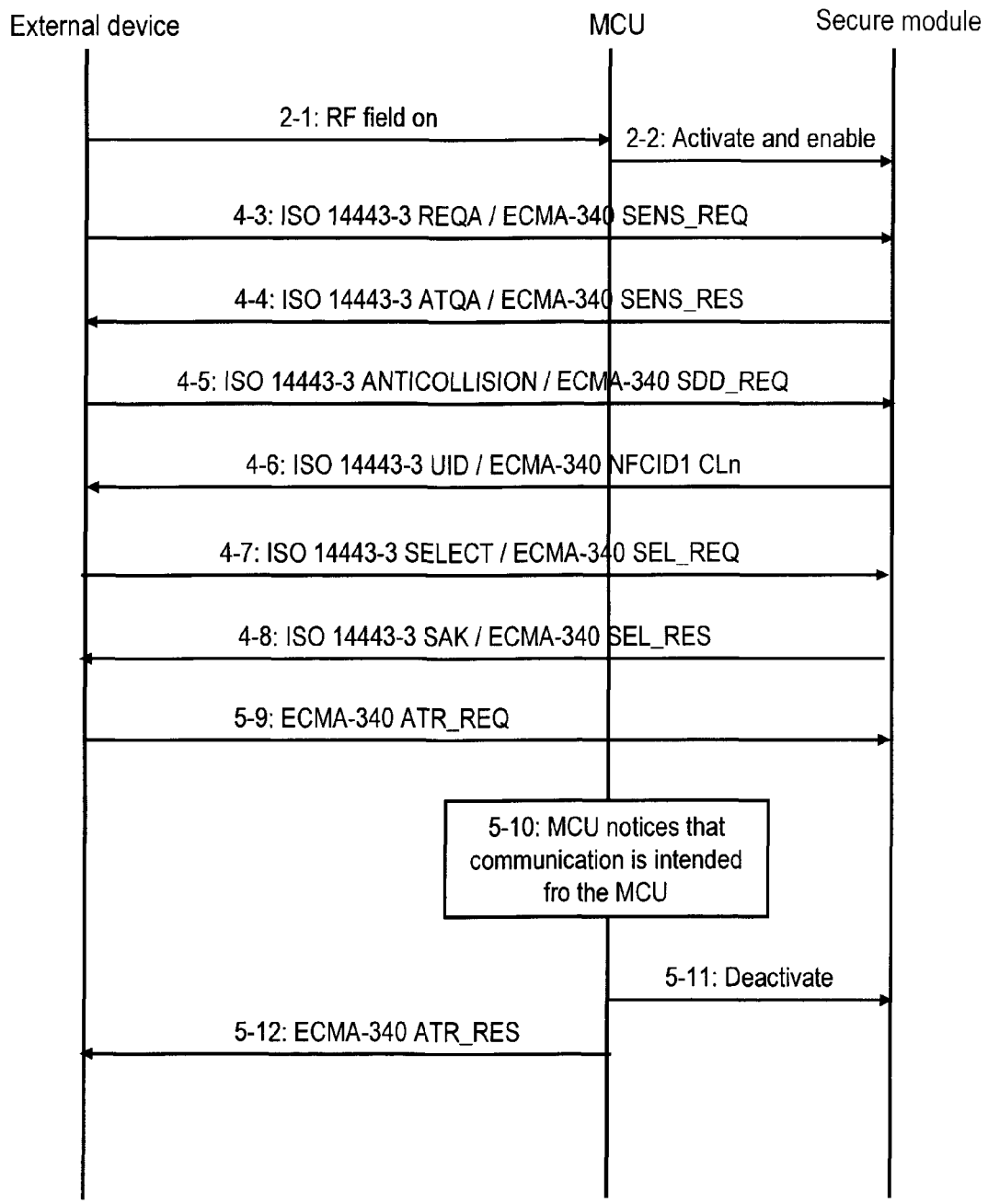
FIG. 5 shows a messaging diagram according to yet another embodiment of the invention.

FIG. 5 shows a messaging diagram according to yet another embodiment of the invention. This example illustrates details of the example of FIG. 3 in case the protocol of ISO 14443 standard and NFCIP-1 protocol of ECMA-340 standard are used. Until message 4-8 the messaging is equal to the messaging of FIG. 4.

Like in FIG. 3 now the external device is seeking to communicate with the MCU according to NFCIP-1 protocol and sends ECMA-340 ATR_REQ message 5-9. The MCU notices this in phase 5-10 and deactivates 5-11 the secure module. Additionally the MCU responds to the ATR_REQ message with ECMA-340 ATR_RES message 5-12 and continues with the near field connection.

It should be appreciated that some of the messages in FIGS. 4 and 5 may be repeated as many times as necessary. For example, if there are more than one RFID tags in a radio field, messages 4-5 and 4-6 relating to anticollision may be sent a plurality of times.

Some embodiments according to the present invention, in which an external device initially sees a secure module when attempting to establish near field communication connection, offer the advantage that some contactless smartcard applications wherein the connection establishment procedure does not proceed to the higher level handshake may be used. For example some applications, in which a secure module is used as a key for an electrical lock may be implemented such that the lock is opened, if the identification information received in message 4-6 of FIG. 4 or 5 matches required access rights. Thus there is basically no need to conduct the higher level handshake. Such implementation is based on that UID (or some other identification information) of the secure module is generally tamperproof, and thereby access may be granted on the basis of the UID. UID of an MCU may however be forged. Thus if initial handshake were conducted with the MCU, such UID-based solution might not be reliable enough, but now that the initial handshake is conducted with the secure module, such solution is available.

According to an embodiment of the invention communication capabilities are transmitted by a secure module in a one byte/eight bits long message accompanied with a possible checksum. This solution is compatible for example with near field communication specifications of ISO 14443, Mifare and NFCIP-1 protocol (of EMCA-340 standard). FIG. 6A-6B show two examples of a communication capability message according to such embodiment of the invention.

FIG. 6A shows an example message 600 indicating capability of communicating according to ISO 14443, Mifare and NFCIP-1. Bits 4 and 5 indicate capability of Mifare communications, bit 6 indicates capability of ISO 14443 communications and bit 7 indicates capability of NFCIP-1 communications. Now value of all bits 4-7 is one and thus an external party sees that all three protocols are supported.

FIG. 6B shows an example message 610 indicating capability of communicating according to ISO 14443 and NFCIP-1 but not according to Mifare. Here value of bits 6 and 7 is one and value of bits 4 and 5 is zero. Thus an external party sees that ISO 14443 and NFCIP-1 are supported but Mifare is not.

It should be appreciated that the message formats of FIGS. 6A and 6B are only illustrative examples and that various other possibilities are available.

Figure 7:
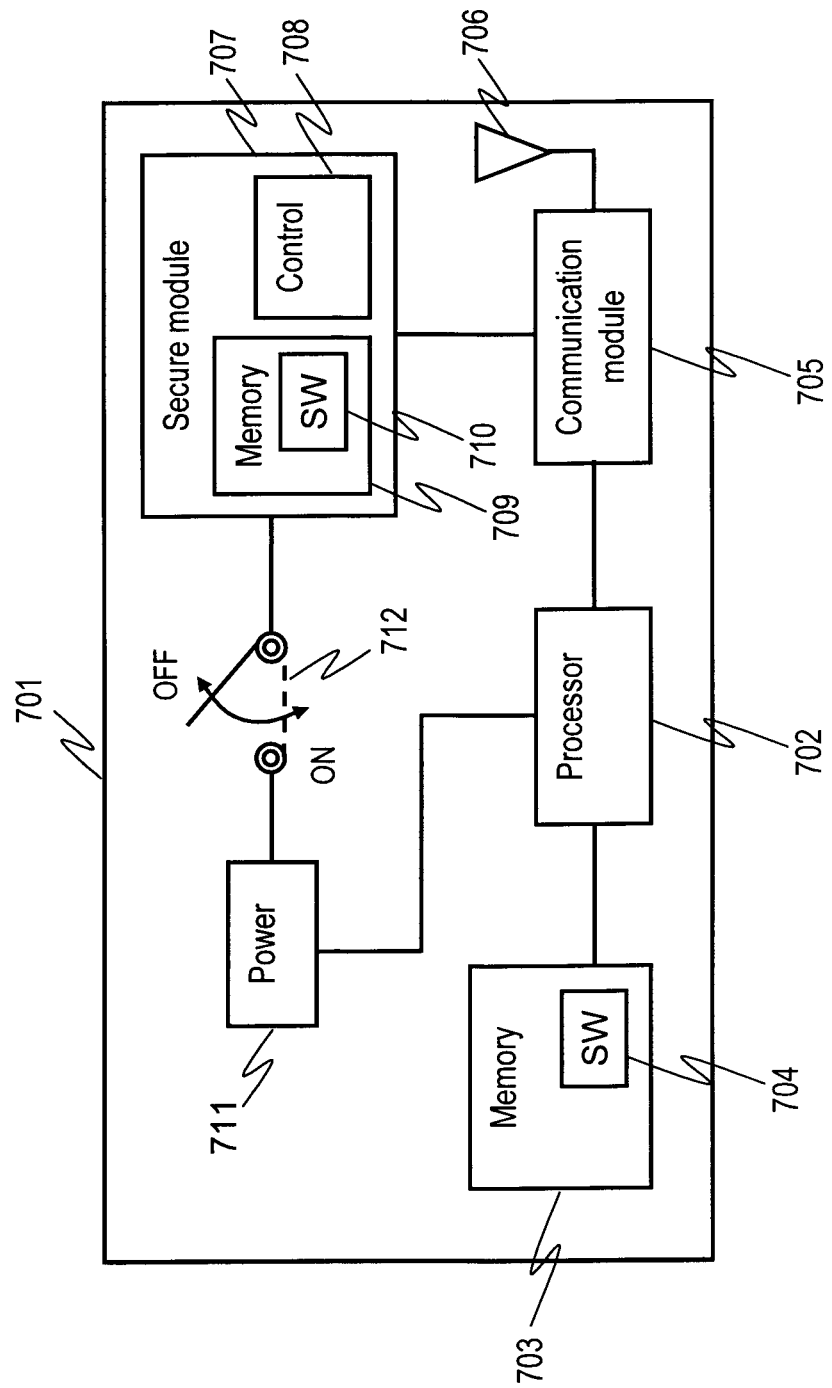
FIG. 7 shows a block diagram of an apparatus according to an embodiment of the invention.

FIG. 7 shows a block diagram of an apparatus 701 according to an embodiment of the invention.

The apparatus comprises a processor 702, which may be called for example a central processing unit (CPU) or microcontroller unit (MCU), for controlling the apparatus. Coupled to the processor there is a memory 703 comprising computer program code or software 704. The software 704 may include instructions for the processor 702 to control the apparatus such as an operating system and different applications. Further the software 704 may comprise instructions for controlling the apparatus to provide the functionality of the invention.

The apparatus 701 further comprises a secure module or element 707, which comprises a control unit 708, a memory 709 and software 710 stored in the memory. The software 710 may include instructions for the control unit 708 to control the secure module such as an operating system and different applications. Further the software 710 may comprise instructions for controlling the secure module to provide the functionality of the invention. The memory may be tamperproof and thereby act as a secure storage area for storing different data in a tamperproof environment on the secure module. The secure data may comprise secure applications, private data, payment details or the like. In an embodiment, the secure module 707 is a smart card or chip permanently integrated, detachably attached or removably mounted into the apparatus 701. In an embodiment, the apparatus comprises a smart card slot (not shown) in which the secure module 707 can be fed. In an embodiment, the secure element 707 is a subscriber identity module (SIM).

The secure module 707 is connected to a power source 711 via a switch 712. The processor 702 may control the switch 712 for activating or deactivating the secure module 707.

The apparatus 701 further comprises a communication module 705 capable of near field communications. The communication module is connected to an antenna 706, which provides an air interface for data exchange with external devices. The communication module may be capable of peer-to-peer type of near field communications where both the apparatus 701 and respective external party are active as well as near field communications where apparatus 701 acts as a passive party. Further the communication module may be capable of near field communications with passive external devices. The communication module 705 is further connected to the processor 702 and to the secure module 707. In an embodiment, the communication module 705 is an RFID communication module. An external device, such as a point-of-sale terminal, a contactless reader or a mobile phone or other user device (not shown), may communicate with the secure module 707 or with the processor 702 via the antenna 706 and the communication module 705.

The communication module may further comprise a switch (not shown) for switching between an internal control connection between the secure module 707 and the processor 702 and an external communication connection between the secure module and the communication module.

In an embodiment of the invention the processor 702 is configured to listen or "eavesdrop" data that is transferred between the secure module and some external device via the communication module. The communication module may be implemented such that, even though a communication connection between the communication module and the secure module is active and a control connection between the processor and the secure module is inactive, also the processor 702 may listen to the data exchange.

In an embodiment of the invention the processor 702 is configured to listen or "eavesdrop" data that is transferred from an external device via the communication module to the secure module. That is, the data transferred from the secure module to the external device may be ignored. In this case the communication module may be implemented such that it provides data that is conveyed to the secure module also to the processor 702.

In addition the apparatus 701 may comprise a user interface (not shown) for receiving user input and providing output to the user.

In an embodiment of the invention the communication module 705 is configured to filter radio frequency fields available via the antenna 706 before allowing the processor 702 to see them such that the processor 702 may not see all available radio fields. In this way the processor does not need to react to all, possibly irrelevant radio fields.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Furthermore, embodiments of the invention may be practiced in various components such as integrated circuit modules. The design of integrated circuits is a highly automated process. Complex and powerful software tools are available for converting a logic level design into a semiconductor circuit design ready to be etched and formed on a semiconductor substrate.

It should be appreciated that in this document, words comprise, include and contain are each used as open-ended expressions with no intended exclusivity.

The foregoing description has provided by way of non-limiting examples of particular implementations and embodiments of the invention a full and informative description of the best method and apparatus presently contemplated by the inventors for carrying out the invention. It is however clear to a person skilled in the art that the invention is not restricted to details of the embodiments presented above, but that it can be implemented in other embodiments using equivalent means without deviating from the characteristics of the invention. It should be appreciated that in any disclosed method the order of specific method steps is only illustrative and not restricted to the disclosed example. Thereby the order of the steps can be varied according to implementation needs.

Furthermore, some of the features of the above-disclosed embodiments of this invention could be used to advantage without the corresponding use of other features. As such, the foregoing description should be considered as merely illustrative of the principles of the present invention, and not in limitation thereof. The scope of the invention is only restricted by the appended patent claims.

The invention claimed is:

1. An apparatus, comprising:
an interface to a secure module hosted by the apparatus;
a communication unit configured to provide a near field communications interface for communicating with external devices;
a switch configured to activate and deactivate the secure module hosted by the apparatus; and
a control unit configured to co-operate with the secure module, wherein
the control unit is configured to:
activate, via the switch, establishment of a near field communication connection through the communication unit to the secure module in response to the communication unit detecting an external radio frequency field for establishment of a near field communication connection by an external device; and
identify a near field communication connection attempt addressed to a functionality of said apparatus instead of a near field communication connection attempt addressed to a functionality of the secure module from the external device.

2. An apparatus according to claim 1, wherein the control unit is further configured to in response to identifying a near field communication connection attempt addressed to a functionality of the apparatus intercept the near field connection establishment in the secure module; and
continue with the near field connection establishment.

3. An apparatus according to claim 1, wherein the control unit is further configured to identify a near field communication connection attempt addressed to a functionality of the secure module in said data exchange relating to the near field connection establishment, and to allow the secure module to continue with the near field connection establishment in response to identifying such indication.

4. An apparatus according to claim 1, wherein the control unit is configured to check, prior to passing near field communication connection establishment to the secure module, whether the apparatus is in such state that the secure module may be activated.

5. An apparatus according to claim 1, further comprising the secure module, wherein
the secure module is configured to provide, in the course of the near field connection establishment, a set of capabilities comprising near field communication capabilities of the secure module and near field communication capabilities of said apparatus.

6. An apparatus according to claim 1, wherein identifying a near field communication attempt comprises listening to data exchange relating to the near field communication connection establishment between the secure module and the external device.

7. A method, comprising:
hosting a secure module in an apparatus;
providing a near field communications interface for communicating with devices external to the apparatus;
operating a switch to activate and deactivate the secure module hosted by the apparatus;
activating, via the switch, establishment of a near field communication connection to the secure module in response to detecting an external radio frequency field for establishment of a near field communication connection by an external device; and
identifying a near field communication connection attempt addressed to a functionality of said apparatus instead of a near field communication connection attempt addressed to a functionality of the secure module from the external device.

8. A method according to claim 7, further comprising:
in response to identifying a near field communication connection attempt addressed to a functionality of the apparatus
intercepting the near field connection establishment in the secure module; and
continuing with the near filed connection establishment.

9. A method according to claim 7, further comprising:
identifying a near field communication connection attempt addressed to functionality of the secure module in said data exchange relating to the near field connection establishment, and
allowing the secure module to continue with the near field connection establishment in response to identifying such indication.

10. A method according to claim 7, further comprising:
checking, prior to passing near field communication connection establishment to the secure module, whether the apparatus is in such state that the secure module may be activated.

11. A method according to claim 7, wherein identifying a near field communication attempt comprises listening to data exchange relating to the near field communication connection establishment between the secure module and the external device.

12. A computer program comprising computer executable program code stored in a non-transitory computer readable medium, the computer program comprising:
 computer executable program code configured to host a secure module in an apparatus;
 computer executable program code configured to provide a near field communications interface for communicating with devices external to the apparatus;
 computer executable program code configured to operate a switch to activate and deactivate the secure module hosted by the apparatus;
 computer executable program code configured to activate, via the switch, establishment of a near field communication connection to the secure module in response to detecting an external radio frequency field for establishment of a near field communication connection by an external device; and
 computer executable program code configured to identify a near field communication connection attempt addressed to a functionality of said apparatus instead of a near field communication attempt addressed to a functionality of the secure module from the external device.

13. A computer program according to claim 12, the computer program code further comprising:
 computer executable program code configured to in response to identifying a near field communication connection attempt addressed to a functionality of the apparatus
 intercept the near field connection establishment in the secure module; and
 continue with the near field connection establishment.

14. A computer program according to claim 12, the computer program further comprising:
 computer executable program code configured to identify a near field communication connection attempt addressed to functionality of the secure module in said data exchange relating to the near field connection establishment, and allow the secure module to continue with the near field connection establishment in response to identifying such indication.

15. A computer program according to claim 12, wherein identifying a near field communication attempt comprises listening to data exchange relating to the near field communication connection establishment between the secure module and the external device.

16. A control unit for use in an apparatus comprising near field communication capabilities, wherein the control unit is configured:
 to co-operate with a secure module;
 in response to detecting an external radio frequency field for establishment of a near field communication connection by an external device, to activate, via a switch, establishment of a near field communication connection through the near field communication capabilities of said apparatus to the secure module; and
 to identify a near field communication connection attempt addressed to a functionality of said apparatus instead of a near field communication connection attempt addressed to a functionality of the secure module from the external device.

17. A control unit according to claim 16, wherein said control unit is implemented on a chipset.

18. A control unit according to claim 16, wherein identifying a near field communication attempt comprises listening to data exchange relating to the near field communication connection establishment between the secure module and the external device.

19. A chipset, comprising:
 a communication unit configured to provide a near field communications interface for communicating with external devices; and
 a control unit configured to co-operate with a secure module, wherein
 the control unit is configured to: activate, via a switch, establishment of a near field communication connection through the communication unit to the secure module in response to the communication unit detecting an external radio frequency field for establishment of a near field communication connection by an external device; and identify a near field communication connection attempt addressed to a functionality of said apparatus instead of a near field communication connection attempt addressed to a functionality of the secure module from the external device.

20. A chipset according to claim 19, wherein identifying a near field communication attempt comprises listening to data exchange relating to the near field communication connection establishment between the secure module and the external device.

* * * * *